H. PELS.
APPARATUS FOR CUTTING SECTIONAL IRON.
APPLICATION FILED MAY 6, 1914.
1,134,903.
Patented Apr. 6, 1915.
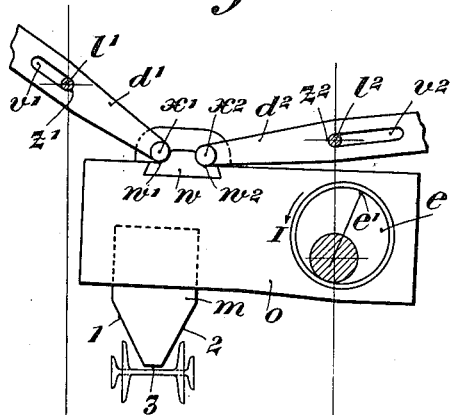
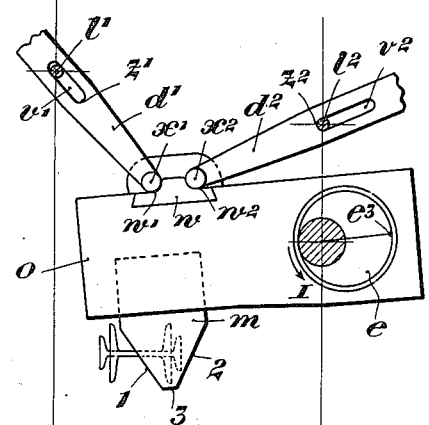
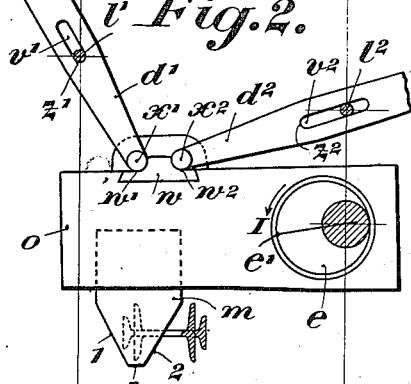
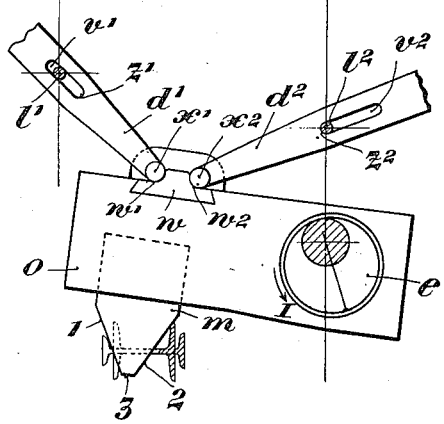
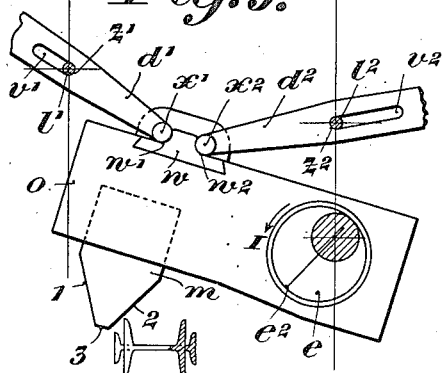
Witnesses:
C. Q. Rowe
Inventor
Henry Pels
by
James L. Norris
Attorney

UNITED STATES PATENT OFFICE.

HENRY PELS, OF BERLIN, GERMANY.

APPARATUS FOR CUTTING SECTIONAL IRON.

1,134,903.  Specification of Letters Patent.  Patented Apr. 6, 1915.

Application filed May 6, 1914. Serial No. 836,738.

*To all whom it may concern:*

Be it known that I, HENRY PELS, a subject of the German Emperor, residing at Berlin, Germany, have invented certain new and useful Improvements in or Relating to Apparatus for Cutting Sectional Iron, of which the following is a specification.

My invention relates to a machine for cutting sectional iron, such as H-girders, Z, T, channel and angle irons, which cuts the girder first in one direction and then in another direction, first by a drawing punching movement, and immediately afterward by a drawing shearing movement, effected by utilizing the arc-like or circular movement of an upper cutter between two vertical lateral cutters and horizontal lower cutters, the girder being supported between, and on, the said cutters. In that way, a cutting of the width of the movable upper cutter or blade is removed from the material. The upper cutter is operated by an eccentric and at the same time by two pressure parts with toggle action, guided in the machine in such a manner that the said pressure parts which are opposite each other, become operative alternately during the cutting in both directions of the girder. During the cutting in one direction one pressure part with a toggle action acts as a guide and the other pressure part with toggle action automatically becomes inoperative, while during the cutting in the other direction, the first pressure part becomes inoperative, and the pressure part previously thrown out of operation becomes operative.

The new machine differs from the machines known hitherto in that the upper cutter being operated by two pressure parts with toggle-action, but at the same time there is an arrangement that only one guide acts at a time, while the other guide is inoperative. Such a working of the machine presupposes the use of an upper cutter or blade which, in addition to the lower preferably flattened cutter used for shearing, has also two lateral cutting edges, the left hand one of which acts during the cutting of the girder toward the left, and the right hand cutting edge acts during the cutting of the girder toward the right. These cutters are made in the known shape as double wedge cutters or blades.

A construction according to this invention is illustrated in the accompanying drawing which shows the most important coöperating parts.

In said drawings: Figures 1 to 5 are diagrammatic elevations, partly in section, showing different successive relations of the parts in a complete operation of the machine, Fig. 1 showing the parts at the commencement of the operation, Fig. 2 showing them during the cutting of one side of the beam, Fig. 3 showing the cutter set to work at the other side of the beam, and Figs. 4 and 5 showing the cutting operation at said other side of the beam.

$o$ is the upper cutter holder driven by an eccentric $e$ and carrying an upper cutter $m$ shaped as a double wedge, with cutting edges 1, 2, 3. The said upper cutter works in the known manner between vertical and horizontal cutters, namely, the lateral and the lower cutters between which the girder is mounted in the known manner. On the back of the upper cutter holder the abutment $w$ is secured in a suitable manner with the bosses or eyes $w^1$ and $w^2$. The movable cutter holder $o$, in addition to the constant action of the eccentric $e$, is further exposed to the action of the pressure parts $d^1$ and $d^2$. These parts when operating, that is to say, during the cutting, determine the direction of movement and the kind of movement of the upper cutter holder, for which reason the pressure parts are called guides.

The pressure parts $d^1$ $d^2$ are provided with slots $v^1$ $v^2$ through which fixed bolts $l^1$, $l^2$ pass, so that, in the case of a certain direction of movement, the pressure parts $d^1$ $d^2$ can freely move on their bolts, and are inoperative. The pressure parts $d^1$ $d^2$ are moreover rotatably mounted on abutment pins $x^1$ $x^2$ in the bosses $w^1$ $w^2$ of the upper cutter holder $o$, and cause the upper cutter holder to move in an arc when the slot ends $z^1$, $z^2$ of the pressure parts $d^1$, $d^2$ engage with the corresponding bolts $l^1$ $l^2$. This results in the following working illustrated in several stages in the drawing.

Let it be assumed that the eccentric is in the raised position shown in Fig. 1 at the point $e^1$. The pin $l^1$ about which the pressure part $d^1$ can rotate, then finds a support at the end $z^1$ of the slot $v^1$. Owing to the eccentric $e$ turning to the left in the direction of the arrow I, the point $e^1$ of the eccentric finally arrives at the left hand position $e^1$ (Fig. 2). The pressure part $d^1$ moves the upper cutter holder $o$ downward. The flattened point 3 of the wedge shaped cutter $m$ penetrates into the girder and makes a drawing punching cut in the web of the girder, which is immediately followed by a drawing shearing cut with the cutting edge 1 of the cutter. In that way, the left hand half of the girder is cut through (Fig. 2). In that position, the pressure part $d^2$ is inoperative. According to the movement and shape of the wedge-shaped cutter $m$, the cutting edge 2 also cuts the right hand half of the girder. After the left hand half of the girder has been cut through, the upper cutter is raised again by any desired mechanical means, so that it assumes the position shown in Fig. 3, so that when the eccentric continues to rotate into the position $e^2$, the end $z^2$ of the slot of the pressure part $d^2$ engages with the bolt $l^2$. From that moment the cutter holder $o$, during further rotation of the eccentric $e$, is exposed only to the action of the latter and of the pressure part $d^2$, while the pressure part $d^1$ is inoperative. The right-hand half of the girder is cut through when the eccentric $e$ has assumed the position $e^3$ (Fig. 4). In that way, the girder is cut through, and the upper cutter holder, owing to continued rotation of the eccentric $e$, returns to the initial position shown in Fig. 1, with simultaneous action of the balancing device used.

Owing to the friction which the upper cutter encounters at the cut through the left-hand half of the girder after completing the left hand cut, it may happen that the upper cutter, in spite of the balancing device, is not brought into the position in Fig. 3, but is moved by the eccentric continuing to rotate, so far to the right that the cutting edge 2 engages with the right hand portion of the girder not yet cut through, and in that way the end $z^2$ of the slot in the pressure part $d^2$ also engages with the bolt $l^2$ (Fig. 5). From that moment, the described cutting action (Fig. 4) takes place.

It will be seen from the foregoing that during the cutting of the girder in the left hand direction, the left hand pressure part $d^1$ is operative, while the right hand pressure part $d^2$ is inoperative. During the cutting of the right hand side of the girder, the right hand pressure part $d^2$ is operative, and the left hand pressure part $d^1$ inoperative.

It will also be seen that thus, without changing or turning, it is possible to cut large and small sections of H girders in one machine in two consecutive operations.

What I claim is:

1. In an apparatus of the type set forth, an upper cutter having a wedge-shaped cutting edge, a holder therefor, a rotating eccentric set into the holder and operating the same, pressure members pivotally connected at the upper side of said holder, and fixed pins forming the respective fulcra of said pressure members, the pressure members being slotted to accommodate said pins and being arranged whereby when one of them is operative to direct the movement of the holder the other is inoperative and vice-versa.

2. In an apparatus of the type set forth, an upper cutter having a wedge-shaped cutting edge, a holder therefor, a rotating eccentric set into the holder for driving the pressure members, the pressure members mounted for sliding and pivotal movement about fixed axes and pivotally connected to said holder, the pressure members being arranged whereby when one of them is operative to direct the movement of the holder the other is inoperative and vice-versa.

In testimony whereof I have hereunto set my hand in presence of two subscribing witnesses.

HENRY PELS.

Witnesses:
HENRY HASPER,
WOLDEMAR HAUPT.